Nov. 30, 1965    J. S. GOLIGHTLY    3,220,821
BENDING MOLD FOR GLASS SHEETS
Filed Jan. 16, 1961
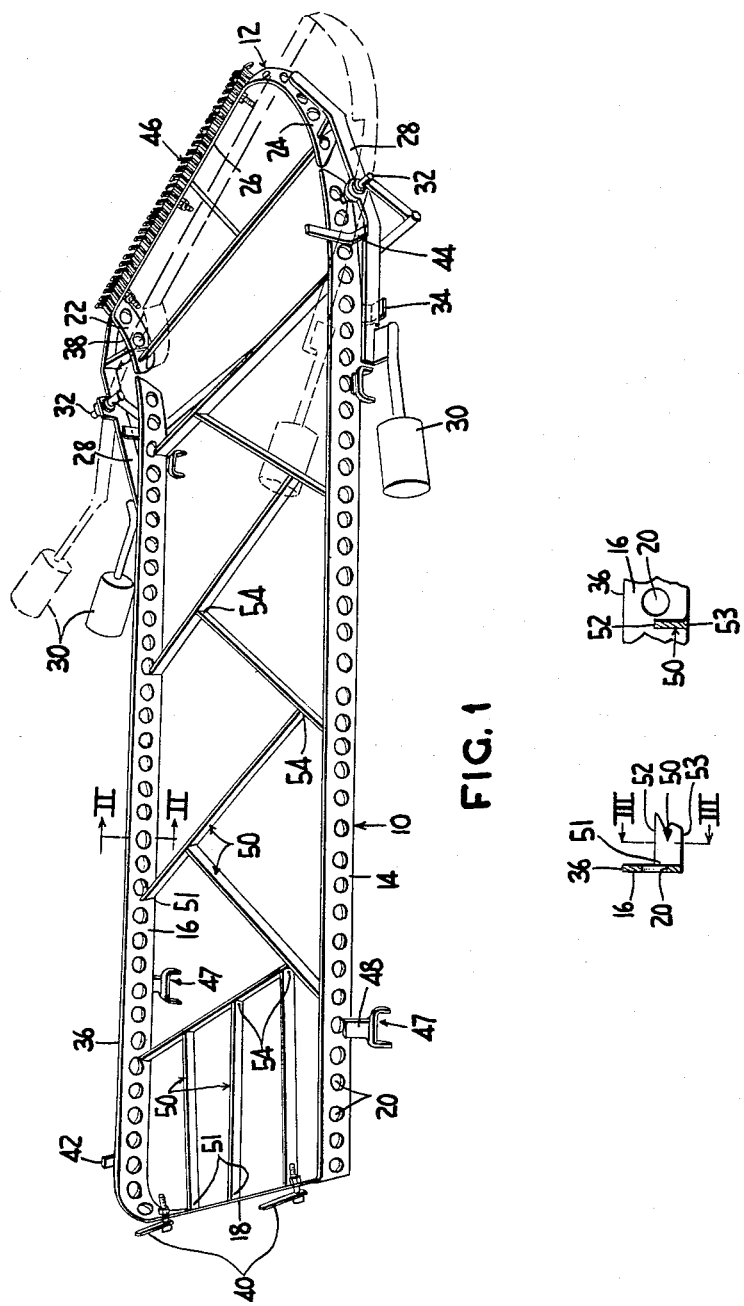
INVENTOR.
JAMES S. GOLIGHTLY
BY Oscar L. Spencer
ATTORNEY

United States Patent Office 3,220,821
Patented Nov. 30, 1965

3,220,821
BENDING MOLD FOR GLASS SHEETS
James S. Golightly, Fox Chapel, Pa., assignor to Pittsburgh Plate Glass Company, Pittsburgh, Pa., a corporation of Pennsylvania
Filed Jan. 16, 1961, Ser. No. 82,948
6 Claims. (Cl. 65—291)

This application is a continuation-in-part of application Serial No. 685,638, filed September 23, 1957, for Treating Glass Sheets, and relates to treating glass sheets, and specifically concerns an improved apparatus for bending and tempering glass sheets.

Glass sheets are bent and tempered on peripheral molds having at least one rail-like molding member disposed edgewise so that its upper edge conforms to the shape desired for at least a portion of a glass sheet to be bent. Usually such peripheral molds comprise rail-like sections disposed edgewise. Flat glass sheets are bent and tempered individually by being supported in bending relation to the mold and exposed to glass bending temperatures until the individual sheet conforms to the upper edge of the peripheral mold. The bent glass sheet is subjected to opposed blasts of tempering fluid such as air while still mounted on the mold to chill the surfaces of the curved glass sheet suddenly before the temperature of the curved sheet has cooled to below its annealing range. The sudden chilling at elevated temperature tempers the bent sheet.

Since the bending and tempering molds are peripheral in nature, it has been common practice to brace them either by reinforcing rods of circular cross-section interconnecting opposite portions of the peripheral rail-like molding members or by providing a reinforcement rail surrounding the rail-like mold with spaced braces interconnecting the mold rails to the reinforcement structure. The necessity for reinforcing the molds to provide rigidity for such molds has become more critical as the size of curved, tempered glass sheets required by automobile manufacturers has increased.

The prior art has braced skeleton molds by employing round bracing rods to criss-cross the space within the mold or a peripheral frame surrounding the mold and connected thereto by spaced braces. Either solution caused unwanted stresses in the glass. These unwanted stresses result from the heat build-up in the relatively massive localized regions formed by the intersection of four rods at each crossing point in the case of criss-cross bracing. In its broadest aspect, the present invention provides skeleton mold bracing structure that minimizes the mass at any localized region, thereby minimizing any variation in heating pattern from that desired by interconnecting a set of bracing members between opposed portions of the skeleton mold in such a way that the bracing members are connected at one end to a rail-like member comprising the mold and at their other end to an adjacent bracing member.

Round bracing rods extending transversely of the mold interfere with the flow of tempering fluid toward the bottom surface of a glass sheet carried by the mold, thus causing local turbulence in the flow of fluid toward the glass and uneven cooling which results in uneven stresses. A peripheral frame requires a mass of metal of relatively high thermal capacity adjacent the periphery of the glass sheet for the mold structure. The relatively high thermal capacity of the frame compared to that of the glass sheet moderates the rate of heating and cooling the periphery of the glass sheet, thus weakening its stress pattern. Also, the thermal efficiency of a bending lehr is diminished when large masses of metal have to be heated simultaneously with heating a glass sheet to softening temperature.

According to a preferred embodiment of the present invention, skeleton molds are made rigid while minimizing the turbulence of the air blasts required to temper the glass resulting from the interposition of bracing members between the tempering fluid source and the glass. This is accomplished by interconnecting sets of specially constructed elongated bracing members in the form of thin bars between opposed portions of the rail-like molding members. The thin bars are less rigid than the molding members and are disposed edgewise with an upper edge below the shaping surface of the mold. The thin bars are oriented obliquely of the mold with one end connected to a molding member and another end connected to another fin. In this manner, the bracing members are so constructed and arranged to impart structural rigidity to a peripheral mold throughout the temperature range from room temperature to glass bending temperature. At the same time, the special edgewise orientation of the special bracing members minimizes obstruction to the flow of tempering fluid.

If the thin bars are not disposed in edgewise orientation, the tempering fluid pattern is impaired. If the thin bars are thickened, their increased thermal capacity spoils the stress pattern in the glass sheets.

Another benefit of the present mold structure is that by orienting the bracing members edgewise, the bracing members provide a louvered effect to shield localized areas of the flat glass sheet from various temperature regions provided by lehr heating elements disposed below the conveyor along which flat glass sheets are carried on molds for bending and tempering. This louvered effect channels the radiation from heat sources of different intensities to insure that the areas of the glass sheet to be maintained relatively flat are exposed only to radiation from heating elements of low intensity while the areas to be bent severely are exposed to the radiation amanating from the intensely energized heating elements. Such louvered effect is especially important in manufacturing tempered side lights for station wagons having an extended flat portion curving sharply at one extremity only.

The benefits of the present invention will become obvious after a description of a particular embodiment thereof which follows.

In the drawings forming part of the description of the particular embodiment of the present invention:

FIGURE 1 is a perspective view of a typical bending and tempering mold shown in its closed mold position in solid lines and in its open mold position in phantom lines.

FIGURE 2 is a sectional veiw along the lines II—II of FIGURE 1.

FIGURE 3 is a fragmentary sectional view along the lines III—III of FIGURE 2.

The particular embodiment disclosed in the drawings refers to a typical bending iron for bending and tempering rear quarter windows of station wagons. However, the principles of the present invention can be employed equally well for constructing molds for glass sheets to be bent to different shapes and tempered and also for merely bending glass sheets.

The bending mold depicted in the drawings includes a main mold section 10 and a rotatable mold section 12. The main mold section 10 comprises an elongated reversely curved rail including spaced, longitudinally extending rail portions 14 and 16 interconnected by an end rail portion 18. The rail is provided with apertures 20 to permit the escape of tempering fluid after it has cooled the undersurface of a glass sheet to be tempered.

Rotatable molding section 12 comprises spaced longitudinally extending rail portions 22 and 24 interconnected by an end rail portion 26. A metal strap 28 is connected to the laterally outboard side of each rail portion 22 and 24 to terminate in a counterweight 30. Each strap 28 is pivoted about a stub pivot rod 32 attached at its inboard extremity to either rail portion 14 or 16 of the main molding section 10. A stop 34 is attached to the undersurface of each of the rail portions 14 and 16 and extends laterally outwardly therefrom to be engaged by the rotating strap 28 to prevent excessive rotation of the rotatable molding section 12 relative to the main molding section 10. Rail portions 22, 24, and 26 are also apertured to permit tempering fluid to escape after cooling the undersurface of the glass sheet supported on the mold.

The main molding section 10 is disposed edgewise to provide an upper edge 36 providing an upper shaping surface conforming in elevation and outline to a portion of the shape desired for the bent glass sheet. Similarly, rotatable molding section 12 is disposed edgewise so that its upper edge 38 conforms in elevation and outline to another portion of the shaping surface desired for the bent glass sheet. End stops 40 are attached to the end rail portion 18 and side stops 42 and 44 are attached to the longitudinally extending rail portions 14 and 16, respectively, adjacent diagonally opposite corners of the main molding section 10, to insure proper alignment of a flat glass sheet on the mold. An edge support 46 is attached outboard of end rail portion 26 of the rotatable molding member 12.

Inverted U-members 47 are attached to the bottom of the main mold section by connectors 48. The members 47 fit loosely on support bars forming part of mold support carriages (not shown) so as to allow for different thermal expansion rates between the mold and its support carriage thoughout the temperature cycle needed to bend and temper glass sheets.

Bracing members 50 in the form of narrow, elongated, thin bars are connected at one end 51 to the inboard side of one of the rail portions 14, 16, 18, 22, 24, or 26. Each bracing member is narrower than the mold rail and has an upper edge 52 disposed below the portion of the mold shaping surface 36 or 38 of its attached molding member and a lower edge 53 substantially aligned with the bottom edge of said molding member. As seen in FIGURE 3, the bracing members 50 have widths greater than their thicknesses and are disposed edgewise to brace the skeleton mold.

The thin bars 50 are grouped in sets interconnected between different rail portions. Each thin bar extends obliquely of the longitudinal axis of the mold in the embodiment illustrated. An end 54 of each thin bar 50 remote from the end 51 attached to a rail portion is connected to another thin bar 50.

The oblique orientation of the thin bars improves the structural rigidity of the mold and also serves to obtain a combination of longitudinal and transverse benefits of the "louver" effect of the thin bars to insure that the various portions of the bottom glass sheet surface are exposed only to radiation emanating from directly below said portion. The edgewise disposition of the obliquely extending thin bars intercepts radiation directed obliquely upwardly toward the bottom surface of a given glass portion from in advance or behind the position occupied by the glass laden mold as the latter traverses the lehr. In addition, radiation from locations flanking the path traversed by each glass portion is simultaneously channeled to intercept only glass portions flanking the given glass portion. If parallel thin bars are oriented normal to the longitudinal axis of an elongated mold, surprisingly, such thin bars fail to provide the desired "louver" effect and do not appreciably improve the structural rigidity in the manner obtained by oblique thin bars.

Orienting bracing members or thin bars 50 obliquely to the longitudinal axis of an elongated mold section so that only one end 51 is attached to a rail portion and another end 54 is attached to another thin bar at a point spaced from a rail portion provides two beneficial effects, namely, to minimize thermal distortion of the mold and to lessen deflection of the air pattern at joints between bracing thin bars and other mold structure (such as ends 51 and 54).

Since the bracing members are of smaller cross-section, and hence, lesser rigidity, than the mold rails, the bracing members rather than the mold rails become distorted to compensate for thermal stresses established as the ambient temperature varies during bending and tempering. This preferential distortion of the thin bars rather than the mold rails is enhanced by virtue of the connection of the thin bars at one end only to a mold rail and at another end to another thin bar.

Each bracing member 50 terminates at connections 51, 54 spaced from the terminal connections of other bracing members. Previously, when oblique bracing members were employed, such as in the apparatus disclosed in Black Patent No. 2,736,140, they were criss-crossed with respect to each other and terminated in close proximity to each other. The congregation of masses at the ends and points of crossing disrupted the stress pattern imparted to the sheet and caused local regions of turbulence in the air blast pattern. These problems are minimized in apparatus constructed according to the present invention.

Surprisingly, the substitution of narrow thin bars 50 for round bracing rods has stiffened skeleton molds and also improved the tempering pattern of glass sheets treated on such molds. Previously, round bracing rods ½ inch (1.27 cm.) in diameter were used to brace tempering irons. By substituting an equal number of edgewise disposed bracing members having a thickness of ⅛ inch (0.32 cm.) and a width of 1 to 1¼ inch (2.54 to 3.18 cm.), the unexpected improved results described above resulted.

The above description of a specific embodiment of the present invention has been for the purpose of illustration rather than limitation. Reference to the latter may be obtained from studying the accompanying claims.

What is claimed is:

1. In a peripheral mold for bending and tempering glass sheets having at least one rail-like molding member disposed edgewise so that its upper edge provides a shaping surface conforming in elevation and outline to the shape desired for at least a portion of the glass sheet to be bent, the improvement comprising a set of bracing members having widths in excess of their thicknesses oriented in edgewise relation and interconnected between opposed portions of said rail-like molding member, the bracing members of the set being connected at one end to said rail-like molding member and at their other end to an adjacent bracing member, each said connection being spaced from each other connection so that only two members are joined at each said connection, the set being so constructed and arranged as to provide structural rigidity to the mold throughout the temperature range from room temperature to glass bending temperature and thereby minimize obstruction to the flow of tempering fluid.

2. The improvement according to claim 1, wherein the upper edges of the bracing members are located below the mold shaping surface.

3. Apparatus for bending glass sheets comprising a peripheral mold comprising a rail-like member having an upper edge conforming in elevation and outline to the shape desired for the bent glass sheet and a set of bracing members interconnected between opposed portions of said mold, the bracing members of the set being connected at one end to said rail-like member and at their other end to an adjacent bracing member, each said connection being spaced from each other connection so that only two members are jointed at each said connection.

4. A glass bending mold according to claim 3, wherein said shaping surface is disposed in a substantially horizontal plane and the upper edges of the members are located below said upper shaping surface.

5. Apparatus for bending glass sheets comprising a skeleton mold having an upper shaping surface conforming in elevation and outline to the shape desired for the bent glass sheets, said shaping surface enclosing a relatively flat area portion and a region where the glass is to be bent sharply, characterized by a network of edgewise disposed thin bars located below said relatively flat area portion and said region being free from said thin bars.

6. Apparatus as in claim 5, wherein the thin bars of said network are interconnected to said skeleton mold in such a manner that each thin bar is connected at one end to said mold and at its other end to an adjacent thin bar, each said connection being spaced from each other connection.

References Cited by the Examiner

UNITED STATES PATENTS

| | | | |
|---|---|---|---|
| 1,016,165 | 1/1912 | Magor | 189—37 |
| 2,736,140 | 2/1956 | Black | 65—291 |

FOREIGN PATENTS

| | | |
|---|---|---|
| 261,215 | 6/1913 | Germany. |
| 469,932 | 12/1928 | Germany. |
| 536,876 | 12/1955 | Italy. |

DONALL H. SYLVESTER, *Primary Examiner.*

ARTHUR P. KENT, MORRIS O. WOLK, *Examiners.*